Feb. 10, 1931. C. W. FREY 1,791,495
BRAKE DRUM VIBRATION DAMPING DEVICE
Filed Feb. 9, 1928
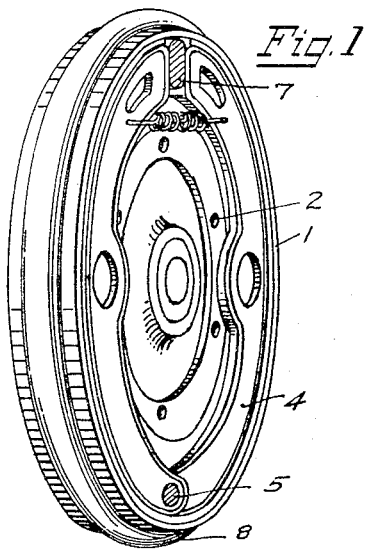
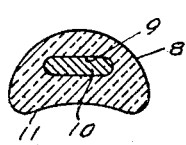
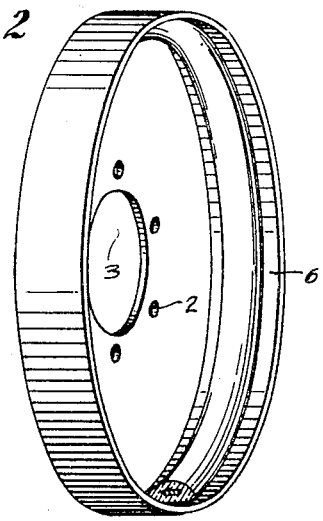
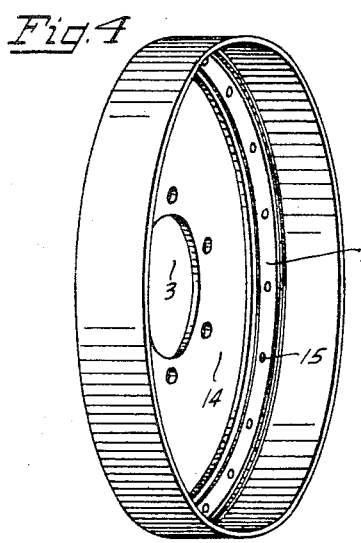
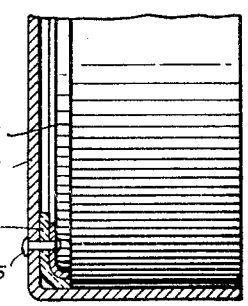
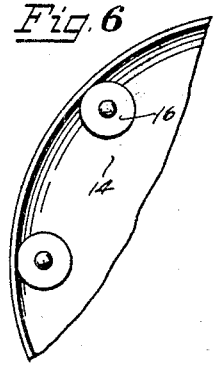
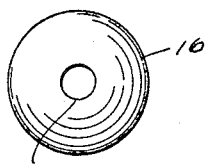
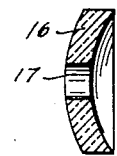
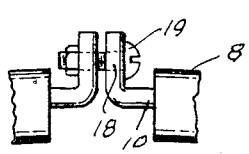
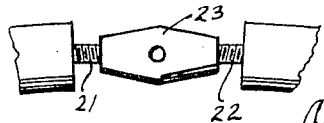
Inventor:
Coyle W. Frey
by Frank M. Slough
His attorney.

Patented Feb. 10, 1931

1,791,495

UNITED STATES PATENT OFFICE

COYLE W. FREY, OF HARVEY, ILLINOIS

BRAKE-DRUM VIBRATION-DAMPING DEVICE

Application filed February 9, 1928. Serial No. 252,961.

My invention relates to improvements in brake mechanisms and relates more especially to improvements in automobile brakes, although it is not limited thereto.

The usual practice for applying the brake mechanism to automobiles is by the application of brake bands or brake shoes which may or may not be lined, to cylindrical brake drums which are attached concentrically to the wheels of the car by means of bolts or rivets. The bands may be externally contracting or internally expanding and in some cases both types may be applied to the same drum.

The brake drum has all the attributes of a bell in that it is fastened by its center end wall to the hub and the annular brake engaging portion is of a highly vibratile nature.

When the brakes of a vehicle such as an automobile are applied to the brake drum, a high frequency vibration or chattering of the vibratile drum portion is commonly set up causing "squealing", which is unpleasant.

It is therefore an object of my invention to provide an improved means whereby the high frequency vibrations which result in the brakes "squealing", may be so damped or suppressed as to avoid the "squeal".

Another object of my invention is to provide a device of the kind described which is easy to install without requiring special tools therefor.

Another object of my invention is to provide a device of the class described which will not detract from the symmetrical appearance of the brake drum.

Still another object of my invention is to provide an improved braking mechanism that is inexpensive to manufacture.

These and other objects of my invention will become apparent from the following description wherein:

Fig. 1 is a perspective view of the brake drum employing one of the embodiments of my invention attached to the periphery thereof;

Fig. 2 is a view similar to Fig. 1, showing the device installed on the inside of the drum;

Fig. 3 is a medial cross-section of the device of Fig. 1;

Fig. 4 is a perspective view of another embodiment of my invention;

Fig. 5 is a cross-section showing the method of applying the embodiment of Fig. 4;

Fig. 6 is a fragmentary view of the brake drum showing another embodiment of my invention;

Fig. 7 is an elevational view of the embodiment shown in Fig. 6;

Fig. 8 is a sectional view of the embodiment of Fig. 7;

Fig. 9 is a coupling that may be used in attaching the device of Fig. 1, to the drum; and Fig. 10 is an elevational view of an adjustable coupling.

Referring now to the figures of the drawings wherein like parts are designated by like reference characters: at 1, I have shown a brake drum which may comprise a pressed steel cylinder having one end thereof open and the other substantially closed end having a central aperture 3, permitting the drum to be placed over the hub to which it is fastened by bolts or rivets inserted through apertures 2 through the drum, disposed radially of the central aperture. At 4, I have shown a pair of braking elements herein illustrated as brake shoes which, it is understood, are fastened to the housing by means of a pin 5 which also serves as a hinge for the two brake shoes and which are adapted to be expanded by the expander 7 with proper rods not shown which lead to the brake pedals of the car.

On the outer surface of the annular walls of the drum I have superposed an annulus or band 8 of preferably semi-circular cross-section composed of rubber, leather or other like material preferably having a cored center. The annulus may be formed of a strip of material and fastened by means of a wire or steel member 10 inserted in the hole 9 and fastening the ends together. The band 8, so formed, is normally preferably of an inner diameter slightly smaller than the outside diameter of the drum, and when the annulus is forced onto the drum, by reason of its resilient character, it adheres tightly thereon, with the surface 11 compressed in contact with the drum.

For brakes of the external contracting type, the device of Fig. 2 will be constructed as if that of Fig. 1 were turned inside out, with the face 11 as its periphery and which, being of slightly larger diameter than the inside diameter of the drum, is forced into the drum and will be held therein by reason of the pressure of the face 11 compressed against the inner circular wall 6 of the drum.

I also contemplate fastening the annulus to the drums without removing the wheels from the car, by means of any suitable clamp such as that shown in Fig. 9, wherein the ends of the steel ring 10, which is disposed in the hole 9, are bent at approximately right angles and provided with apertures 18 to receive a bolt 19, which may be tightened and the annulus drawn tightly upon the drum.

The coupling may be made adjustable to vary the tension of the annulus by providing turn buckle 23 as shown in Fig. 10 which engages the right and left hand threads of the steel ring ends 21 and 22, respectively.

In vehicles employing brakes of both the internal expanding and external contracting type applied to the same drum, I contemplate applying an annular strip of rubber or like material 20 of concavo-convex cross-section to the inner end wall of the brake drum adjacent the brake engaging portion and which may be held therein by means of a ring 13 superposed upon the strip which clamps it securely against the wall 14 by means of rivets 15. The annulus may contact with the inner vibrating portion of the drum, there usually being a slight clearance between the brake shoe and the end wall.

I sometimes attach to the end wall 14 of a brake drum, a plurality of concavo convex disks 16 of rubber or like material having apertures 17 which will allow them to be bolted to the brake drum end wall.

Although I have herein described the use of rubber for the device, any semi-plastic or fabric material may be so used, and I do not desire to limit my invention thereby, but desire to include any material that may have vibration absorbing qualities.

Having thus described my invention in certain specific embodiments, I am aware that numerous and extensive departures may be made from the embodiments herein illustrated and described without departing from the spirit of my invention.

I claim:

1. In combination with the brake drum of a vehicle, a tubular annulus carried by the drum, said annulus substantially comprised of a material relatively non-conductive to sound vibrations, and a metallic core member disposed in the annulus, and contracted in diameter to hold said annulus tightly pressed against the vibratile portion of the drum.

2. In combination with the brake drum of a vehicle, a tubular annulus carried by the drum, said annulus substantially comprised of a material relatively non-conductive of sound vibrations, and substantially filled by a core member disposed therein, and contracted in diameter to hold it tightly pressed against the drum, the material of the core member being disposed in cross-sectional shape to render the same flexible.

3. In combination with a brake drum of a vehicle, a tubular annulus carried by the drum, said annulus substantially comprised of a material relatively non-conductive to sound vibrations, and having a flexible metallic core member longitudinally disposed therein, and contracted in diameter to hold said annulus tightly pressed against the brake drum.

In testimony whereof I hereunto affix my signature this 15th day of February, 1928.

COYLE W. FREY.